UNITED STATES PATENT OFFICE.

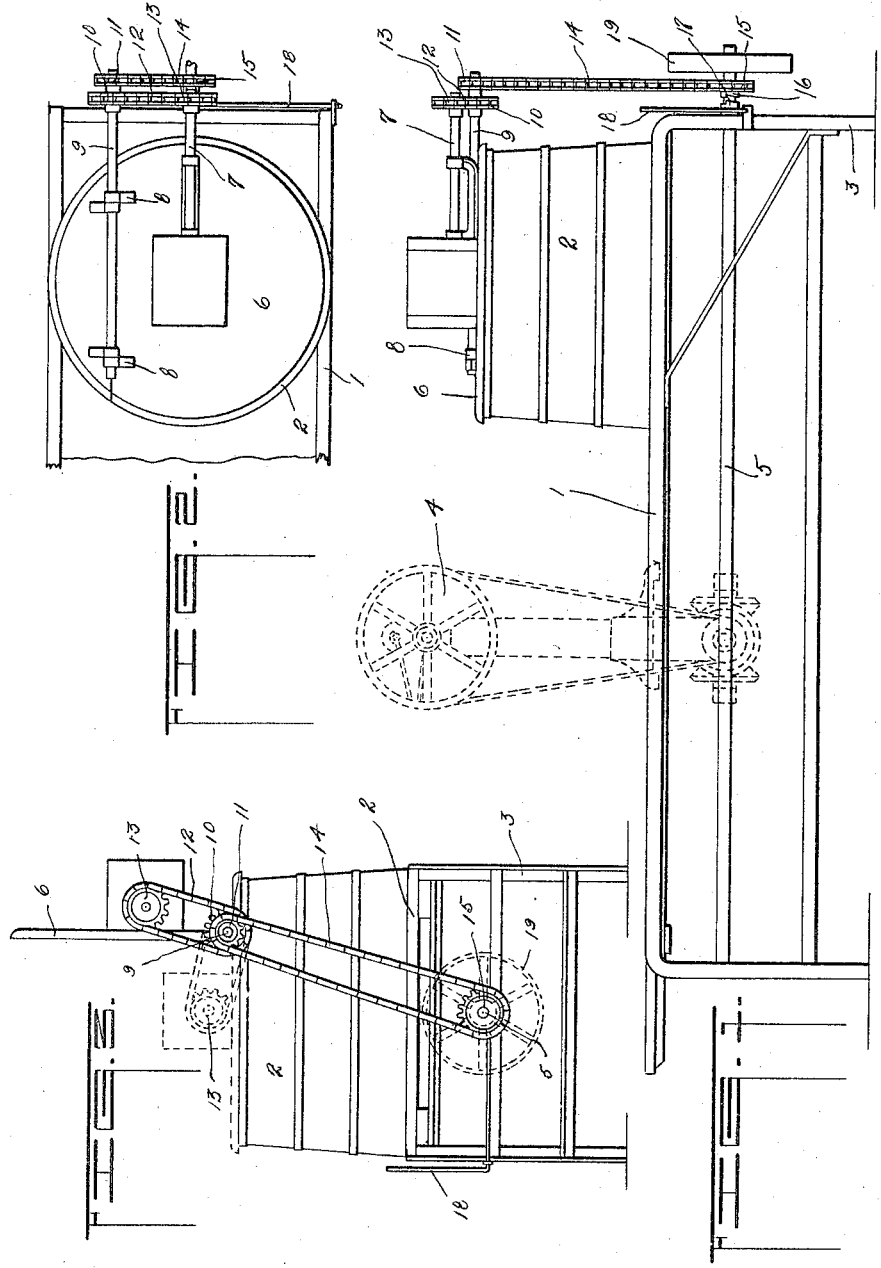

ALPHEUS W. ALTORFER, OF ROANOKE, ILLINOIS, ASSIGNOR TO ALTORFER BROS. COMPANY, OF EAST PEORIA, ILLINOIS, A CORPORATION OF ILLINOIS.

DRIVING MECHANISM.

1,179,790.   Specification of Letters Patent.   Patented Apr. 18, 1916.

Application filed August 29, 1913. Serial No. 787,305.

*To all whom it may concern:*

Be it known that I, ALPHEUS W. ALTORFER, a citizen of the United States, residing at Roanoke, in the county of Woodford and State of Illinois, have invented certain new and useful Improvements in Driving Mechanism, of which the following is a specification.

This invention has reference to a driving mechanism.

One of the objects of the present invention is to improve the driving mechanism of power washing machines and like structures.

The invention consists essentially of a driving shaft which may be adapted to receive its power from any suitable motor or other source; means carried by and movable or swingable with the lid or cover of the washer for actuating the washer elements; driving connections between driving shaft and said washer elements actuating means, and a clutch suitably placed and controlling the transmission of power from a driving shaft to said washer elements.

In the drawing;—Figure 1 is a side elevation of a preferred form of washing machine, embodying my improvements; Fig. 2 is a plan view of the washer showing the driving mechanism, the same being broken away, and Fig. 3 is an end view, looking at the right hand end of Fig. 1, with the lid or cover of the washer raised, in dotted lines, showing the lid or cover lowered or closed, being its operative position.

Like characters of reference denote corresponding parts throughout the figures.

My improved driving mechanism for washing machines is applicable to all forms of machines where it is desired to operate the washer elements by power, such as an electric motor, water motor, gasolene engine and the like, including not only that type of machine shown in the drawings where a platform machine is illustrated, but also to the "Stave leg" type and all other and various forms of washing machines.

In illustrating the preferred embodiment of the invention, I have shown it applied to that type of machine, including the platform 1, which may be of any suitable length and arranged to support the washer tub 2, and one or more rinse tubs or other receptacles, not shown. The platform 1 has supporting legs 3, at its corners. The detail structure of the platform, its legs, braces, etc., is not material, as no claim is made to such details.

In Patents Nos. 1,047,118 and 1,047,119 issued to me on the 10th day of December, 1912, there is illustrated a type of machine and supporting platform, somewhat similar to that disclosed herein, including a movable or slidable wringer support, illustrated herein in dotted lines in Fig. 1 and referred to generally as 4; the wringer mechanism adapted to receive its power from the driving shaft 5. In my application filed on the 12th day of September, 1912, for improvements in combined power washing and wringing mechanism, bearing Serial No. 719,935, I also show a machine and supporting platform, including the movable wringer support.

The washing machine 2 may be provided with any desirable or preferred form of washer elements, not shown, the same adapted to be actuated by any suitable operating means, preferably supported by or attached to the lid or cover 6 of the washer, including the shaft 7. The lid or cover 6 is hinged at points 8, the pintle or spindle 9 of the hinge, also serving as a counter-shaft by means of which power may be transmitted from the driving shaft 5 to the shaft 7, in manner to be described. Raising the lid or cover 6 will so place the washer elements that access may be easily had to the interior of the machine.

On the shaft 9 are carried sprocket wheels 10 and 11, the former operating a chain 12 which engages and operates a sprocket wheel 13 carried on the shaft 7, and the latter wheel operated by a chain 14 which receives its power from and is operated by a sprocket wheel 15 carried on the driving shaft 5.

The sprocket wheel 15 is shown loose on the shaft 5 and provided with a clutch part 16. Said wheel 15 is adapted to be clutched to said shaft 5 by means of a clutch part 17 slidably keyed on the shaft 5 which may be moved into clutch relation with the part 16 of the wheel 15. For moving the part 17 into and out of engaging relation with the part 16, a lever 18 or other shifting means may be provided.

I have elected to show a clutch means on the shaft 5 for controlling the transmission of power from said shaft to the shaft 7;

but it is obvious that the clutch mechanism may be placed on the shaft 7 or the shaft 9 without departing from the spirit or scope of the invention.

On the shaft 5 is a pulley 19, or equivalent member for receiving power from any suitable motor or other driving means.

Attention is called to the patent issued to me on July 1, 1913, No. 1,066,070 as disclosing a type of machine to which the present improvements might easily be applied.

What I claim is:—

1. In a driving mechanism, a machine, a hinged member for the top of said machine, the pintle forming a hinge part also serving as a shaft, an operating shaft journaled on said hinged member, a driving shaft, a belt connection between said driving shaft and said shaft forming the pintle of the hinge, and a belt connection between said last mentioned shaft and said operating shaft.

2. In a driving mechanism, a machine, a hinged member for the top of said machine, the pintle forming a hinge part also serving as a shaft, a pair of sprocket wheels on said shaft, an operating shaft journaled on said hinged member, a sprocket wheel on said operating shaft, a belt connection between the sprocket wheel on the operating shaft and one of said sprocket wheels on the pintle shaft, said belt adapted to be raised and lowered with said hinged member, a driving shaft, a sprocket wheel on said driving shaft, and a belt between said last mentioned sprocket wheel and the other of said sprocket wheels on the pintle shaft.

3. In a driving mechanism, a machine, a hinged member for the top of said machine, the pintle forming a hinge part also serving as a shaft, a pair of sprocket wheels on said shaft, an operating shaft journaled on said hinged member, a sprocket wheel on said operating shaft, a belt connection between the sprocket wheel on the operating shaft and one of said sprocket wheels on the pintle shaft, said belt adapted to be raised and lowered with said hinged member, a driving shaft, a sprocket wheel on said driving shaft, a belt between said last mentioned sprocket wheel and the other of said sprocket wheels on the pintle shaft, and a clutch on the driving shaft for controlling the transmission of power from the driving shaft to the operating shaft.

4. In a driving mechanism, a machine, a hinged member for the top of said machine, the pintle forming a hinge part also serving as a shaft, an operating shaft journaled on said hinged member, a driving shaft, driving connections between said driving shaft and said shaft forming the pintle of the hinges, driving connections between said last mentioned shaft and said operating shaft, and a clutch on the driving shaft for controlling the transmission of power from the driving shaft to the operating shaft.

In testimony whereof I affix my signature, in presence of two witnesses.

ALPHEUS W. ALTORFER.

Witnesses:
G. H. ALTORFER,
B. GEIGER.

Copies of this patent may be obtained for five cents each, by addressing the "Commissioner of Patents, Washington, D. C."